United States Patent
Elias

(10) Patent No.: US 10,649,171 B2
(45) Date of Patent: May 12, 2020

(54) FOLLOW FOCUS

(71) Applicant: James Elias, Rosenheim (DE)

(72) Inventor: James Elias, Rosenheim (DE)

(73) Assignee: Andrew Subratie, Surrey (GB)

( * ) Notice: Subject to any disclaimer, the term of this patent is extended or adjusted under 35 U.S.C. 154(b) by 0 days.

(21) Appl. No.: 15/412,139

(22) Filed: Jan. 23, 2017

(65) Prior Publication Data

US 2017/0212323 A1 Jul. 27, 2017

(30) Foreign Application Priority Data

Jan. 23, 2016 (GB) .................................. 1601257.7

(51) Int. Cl.
*G02B 7/04* (2006.01)

(52) U.S. Cl.
CPC ....................................... *G02B 7/04* (2013.01)

(58) Field of Classification Search
CPC ........................................................ G02B 7/04
USPC .................................................. 348/345, 373
See application file for complete search history.

(56) References Cited

U.S. PATENT DOCUMENTS

| | | |
|---|---|---|
| 2,615,664 A | 10/1952 | Reeves |
| 3,479,944 A | 11/1969 | Barr |
| 3,589,260 A | 6/1971 | Ferra |
| 3,650,192 A | 3/1972 | Kellner |
| 3,650,504 A | 3/1972 | Dormody |
| 3,832,722 A | 8/1974 | Douglas |
| 3,950,766 A | 4/1976 | Erlichman et al. |
| 3,962,707 A | 6/1976 | Galbraith, Jr. |

(Continued)

FOREIGN PATENT DOCUMENTS

| | | |
|---|---|---|
| CN | 201749276 | 2/2011 |
| CN | 201965381 | 9/2011 |

(Continued)

OTHER PUBLICATIONS

SHAPE Shadow Series Follow Focus Pro User's Manual, May 2014.

(Continued)

*Primary Examiner* — Joel W Fosselman
(74) *Attorney, Agent, or Firm* — Fay Sharpe LLP

(57) ABSTRACT

A follow focus, comprising a main bridge including a transmission housing and an output gear, a removable arm including an input gear and a lens turning gear or an interface capable of receiving a lens gear, an axial securement means that is operable by hand to engage to prevent axial movement between the arm and the transmission housing, and disengages to allow the arm to be rotated and/or removed, such that between the arm and the main bridge there is provided a first engagement element having a substantially axial face having projections and a second engagement element substantially axial face having corresponding indentations, wherein either the first or the second engagement element has a threaded outer circumference and may be fixably rotated, and wherein the first engagement element is borne by the arm, and the second engagement element is borne on the transmission housing such that the axial securement means may be operated to secure the arm to the main bridge so that the projections and corresponding indentations of the first and second engagement elements engage to prevent rotational movement of the arm relative to the transmission housing.

20 Claims, 6 Drawing Sheets

(56) References Cited

U.S. PATENT DOCUMENTS

| | | | |
|---|---|---|---|
| 3,972,057 A | 7/1976 | Whiteside | |
| 4,156,567 A | 5/1979 | Ostrowski | |
| 4,162,696 A | 7/1979 | Sprung | |
| 4,353,634 A | 10/1982 | Himmelsbach | |
| 4,355,777 A | 10/1982 | Greenstreet | |
| 4,441,794 A | 4/1984 | Field | |
| 4,501,401 A | 2/1985 | Conee | |
| 4,606,524 A | 8/1986 | Conee | |
| 4,687,312 A | 8/1987 | Navarro | |
| 4,788,916 A | 12/1988 | Saxton | |
| 4,885,950 A | 12/1989 | Smith | |
| 4,946,272 A | 8/1990 | Brown | |
| D310,677 S | 9/1990 | Stidham, Jr. et al. | |
| 5,229,798 A | 7/1993 | Brown | |
| 5,230,490 A | 7/1993 | Sloop | |
| 5,347,432 A | 9/1994 | Chiavetta | |
| 5,547,330 A | 8/1996 | Walimaa et al. | |
| 5,870,641 A | 2/1999 | Chrosziel | |
| 6,024,664 A | 2/2000 | Shaffner | |
| 6,161,933 A | 12/2000 | Tschida et al. | |
| 6,597,873 B2 | 7/2003 | Doi | |
| 7,077,582 B2 | 7/2006 | Johnson | |
| 7,390,131 B2 | 6/2008 | Schaller | |
| 7,575,324 B2 | 8/2009 | Elias et al. | |
| 7,841,784 B2 | 11/2010 | Elias et al. | |
| 7,883,222 B2 | 2/2011 | Elias et al. | |
| 10,067,409 B2 | 9/2018 | Elias | |
| 2004/0151492 A1 | 8/2004 | Blok et al. | |
| 2010/0259669 A1* | 10/2010 | Wood | G03B 17/568 348/345 |
| 2014/0190299 A1 | 7/2014 | Elias | |
| 2015/0286028 A1 | 10/2015 | McCurrey | |

FOREIGN PATENT DOCUMENTS

| | | |
|---|---|---|
| CN | 203720508 | 7/2014 |
| DE | 1937173 | 4/1966 |
| DE | 9016714 | 2/1991 |
| DE | 4018414 | 12/1991 |
| DE | 29819493 | 12/1998 |
| DE | 202005004068 | 6/2005 |
| DE | 102008061036 | 6/2010 |
| DE | 202011108150 | 1/2012 |
| EP | 0574105 | 12/1993 |
| EP | 2752711 | 7/2014 |
| WO | WO 2007/002507 | 1/2007 |

OTHER PUBLICATIONS

ARRI Follow Focus FF-3 / FF-4 / FF-5 HD, Configuration Overview—6.2.0 / Jul. 2010.

VOCAS Follow focus manual focus controller MFC-1 exploded, 0500-0001, Version Date: Oct. 30, 2012, downloaded Dec. 23, 2018, 1 page.

VOCAS Follow Focus MFC-2S, Jan. 2015, downloaded Dec. 23, 2018, 2 pages.

"Oconnor Cine Follow Focus One C1241-0001" User Guide, Copyright 2011, The Vitec Group plc, 20 pages.

Publication No. S2153-4980/1, Original Instructions: English, Copyright 2013, Published by: Vitec Videocom Ltd., 12 pages.

"G-BFOC—Bravo Follow Focus" User Guide, GENUS, 2010 Genus Limited, 2 pgs.

* cited by examiner

FOLLOW FOCUS

CROSS-REFERENCE TO RELATED APPLICATIONS

This application claims priority to and the benefit of Great Britain Patent Application No. GB1601257.7, filed Jan. 23, 2016, the entirety of which is hereby incorporated by reference as if fully set forth herein.

The present specification relates to a follow focus, that is, a device for cameras (usually film or video cameras) which engages with a focus, zoom, aperture or other adjustment ring on the camera to allow a user to more conveniently adjust those rings.

A known type of follow focus 21 is shown in FIGS. 1 to 3. A handwheel 20 is mounted on a camera 10 by sliding a follow focus transmission housing or main bridge 24 onto accessory carrier rods 14 which extend from the accessory base plate 12 of the camera 10. The main bridge 24 also includes a clamp 28 which houses an output gear 30 which transforms the rotation of the handwheel 20 through 90° usually by means of a right-angled gearing (such as bevelled gearing or helical gearing). A rotatable arm 22 transfers the rotation of the output gear 30 to a driving pinion 26 located at its distal end. This driving pinion 26 engages with a lens gear ring 25 on the camera's lens 18. Referring to FIG. 2, the rotatable arm 22 has an arm input gear 32 (visible in FIG. 3) which couples with the output gear 30 of the main bridge 24 so that torque is transferred from the handwheel 20 and output gear 30 to the rotatable arm 22. The arm input gear 32 transfers the rotation, usually by means of an internal drive belt, to the driving pinion 26.

A follow focus is generally required to work with different cameras. Thus the rotatable arm 22 can be rotated (and/or interchanged with different rotatable arms) so that the driving pinion 26 can be brought to an engaging position with the lens gear ring 25 of lenses that may be positioned differently or have different diameters. Referring to FIG. 2, the rotatable arm 22 is may be detachable, the output gear 30 and clamp 28 being able to accept the rotatable arm 22 either in a rear position or a front position, since the position of the matte box (lens shade) 16 and the lens gear ring 25 may mean that fitting the rotatable arm 22 to the front position of the output gear 30 is more convenient. A detachable rotatable arm 22 allows for more flexibility in the axial positioning of the follow-focus along the accessory carrier rods 14, e.g. to allow for additional mounting of a matte box (lens shade) 16 that would be blocked by the follow-focus main bridge 24 if the arm can not be swapped round and the follow-focus bridge shifted away from the matte box, on the accessory carrier rods accordingly.

Referring to FIG. 3, the output gear 30 includes two similar coaxial opposing splined or toothed output couplings, only the forward-facing output coupling 31 being here visible (the term forward being used here to refer to the direction that the camera lens is directed at). A threaded stud 34 turnable by a head 36 (visible in FIG. 2) axially secures the rotatable arm 22 to the output gear 30 of the main bridge 24.

The arm input gear 32 is toothed in a corresponding manner to engage with either output coupling so that the rotation of the output couplings causes the arm input gear 32 and ultimately the driving pinion 26 and the lens gear ring 25 to turn.

Once correctly positioned, the circumference of the rotatable arm 22 must be fixed relative to the circumference of the lens gear ring 25, so that the driving pinion 26 is not forced away from the lens gear ring 25 by the tangential separating force of the gears. The arm input gear 32 is surrounded by a boss 35. When the output gear 30 is fully inserted either opening of the clamp 28 so as to fully engage with the output coupling 31 in that opening, two threaded thumb lever screws 29 are turned cause the clamp to exert a clamping force on the boss 35, and so secure the rotatable arm 22 against the lens gear ring 25.

In order to achieve a sufficient clamping force, an adequate clamping length is required, and this adds bulk to the follow focus 21. Also, the thumb lever screws 29 can be difficult to operate, particularly if the rotatable arm 22 position needs adjusting while the follow focus 21 is already attached to the camera 10.

The present invention aims to provide a follow focus 21 which is convenient to use and which reduces these shortcomings.

According to the present invention, there is provided a follow focus according to the independent claims.

The invention will now be described, by way of example, with reference to the drawings, of which FIG. 1 is a perspective view of a known follow focus fitted on a camera;

Figure 1:
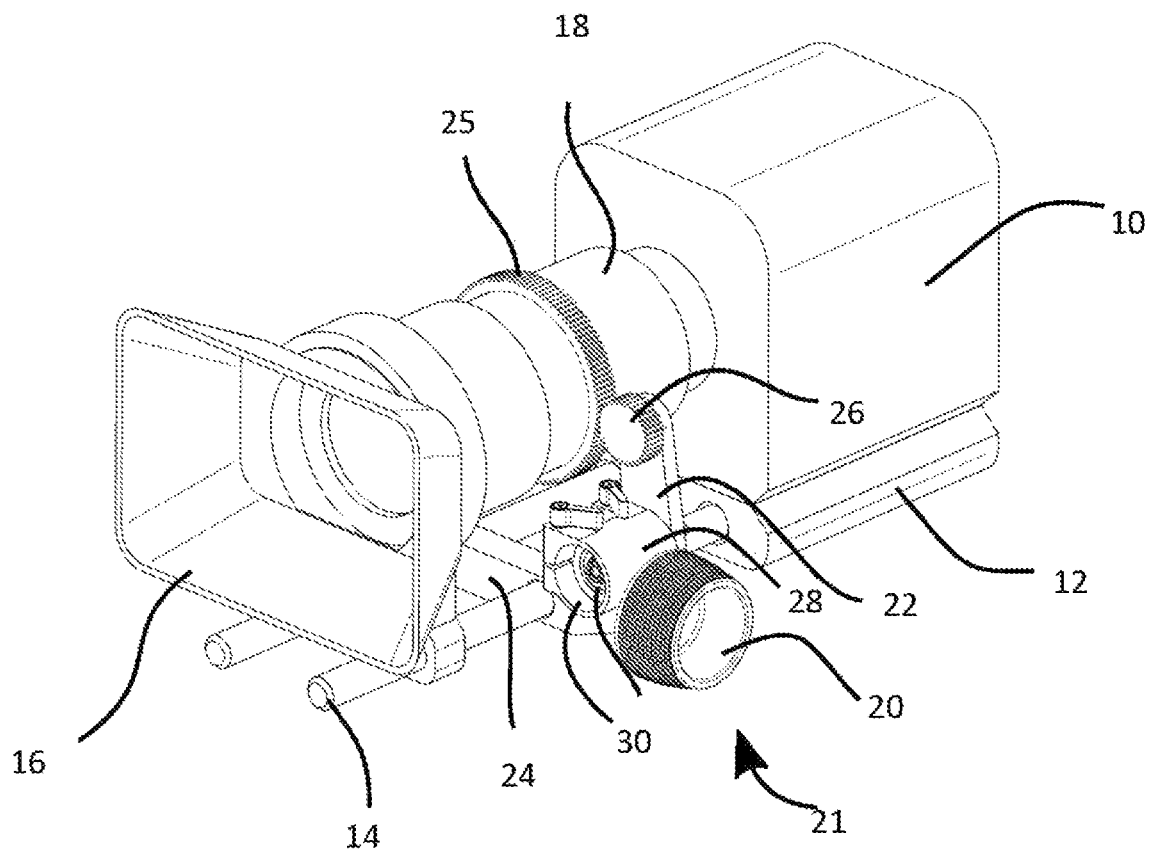
Figure 2:
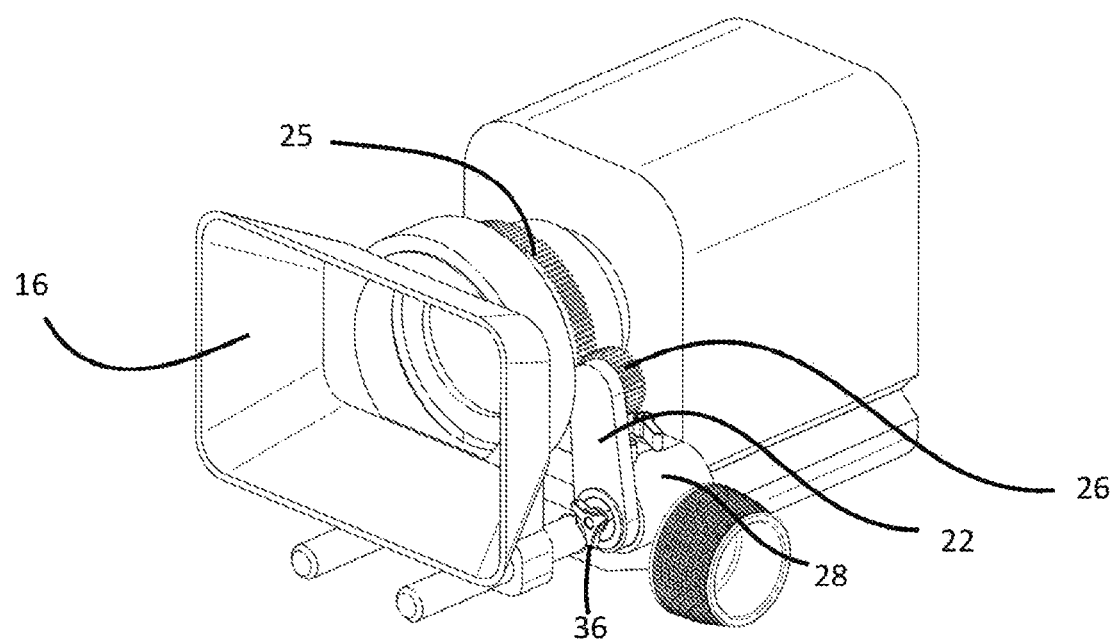
FIG. 2 is a perspective view of the known follow focus fitted on a different camera.
Figure 3:
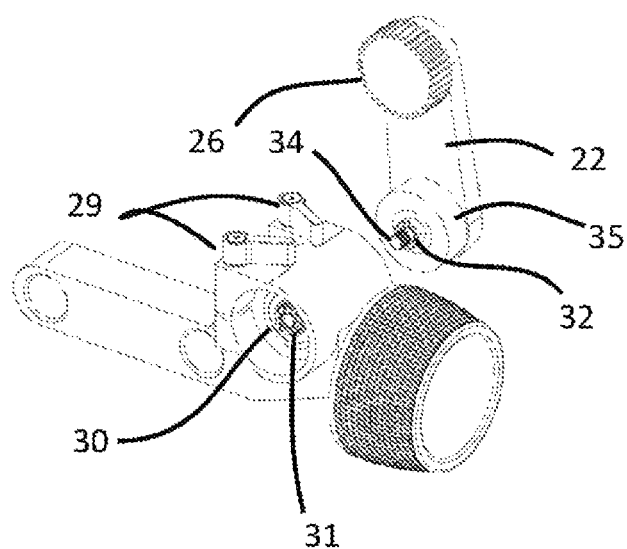
FIG. 3 is a perspective view of the known follow focus partially dismantled.
Figure 4:
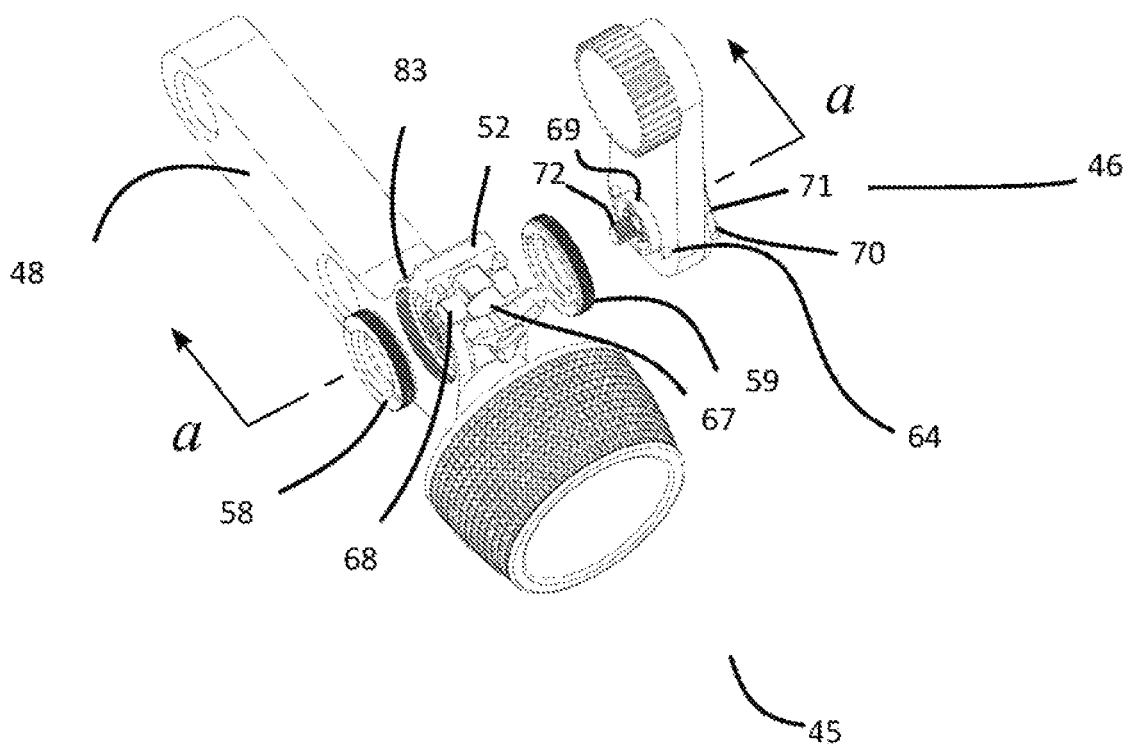
FIG. 4 is a partially exploded perspective view of part of the new follow focus.

Referring to FIG. 4, the follow focus 45 generally comprises a rotatable arm 46 and main bridge 48. The main bridge 48 includes a transmission housing 83 part of which functions as a clamp 52. Two threaded rings, first interference ring 58 and second interference ring 59, are set in the transmission housing 83, engaging with corresponding threads. The transmission housing 83 can exert a clamping force on the first interference ring 58 and second interference ring 59 by means of screw 67 and cross-beam 68. This arrangement gives a high clamping force per axial unit length is greatly increased when compared to smooth cylindrical surfaces) due to the wedge effect of the thread and the increased overall surface area. In turn, the length of the clamp may be reduced. Each interference ring 57, 58 includes a pair of keyways 65.

Figure 5:
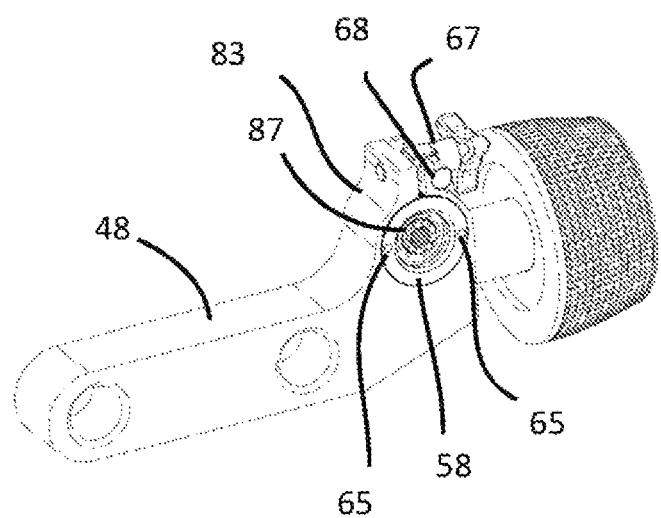
FIG. 5 is a perspective view of part of the new follow focus.

Referring also to FIG. 5, the transmission housing 83 includes an output gear 54 which includes a first axial coupling face 87 and second axial coupling face 88 which face in opposite directions. The output gear 30 is mounted in a pair of output gear ball bearings 96, 97 to allow it to be turned with comparatively little friction. The output gear 54 includes a threaded central throughbore 89.

The rotatable arm 46 includes a belt pulley 66 which operates as an input gear having a coupling 62, surrounded by a circular locating flange 69. The rotatable arm 46 is fitted to the main bridge 48 by placing the coupling 62 against whichever axial coupling face is chosen, the circular locating flange 69 aiding the location by engaging with a corresponding circular groove provided around the axial coupling face. The arm housing 63 includes two projecting keyed elements 64 such that when the rotatable arm 46 is oriented correctly, these keyed elements 64 interlock with the keyways 65 provided on the interference rings, 58, 59. These keyed elements 64 may be shorter than the circular flange 69 so the circular flange locates before the keyed elements and allows the arm to be rotated until the keyed elements engage. The rotatable arm 46 includes a threaded stud 70, whose threaded shaft 72 may be turned by a head 71. When the coupling 62 of the belt pulley 66 abuts the axial coupling face 87 or 88, the shaft 72 is introduced to the central bore 89 of the output gear 54, and the head 71 rotated so that the shaft 72 engages with the thread of the central bore 89, axially securing the rotatable arm 46 to the main bridge 48. The rotatable arm 46 may be rotationally adjusted by loosening the clamp 52 until the desired orientation is reached, before screw 67 is retightened. Rotation of the rotatable arm 46 is now prevented by the engagement of the keyed elements 64 and keyways 65.

Figure 6:
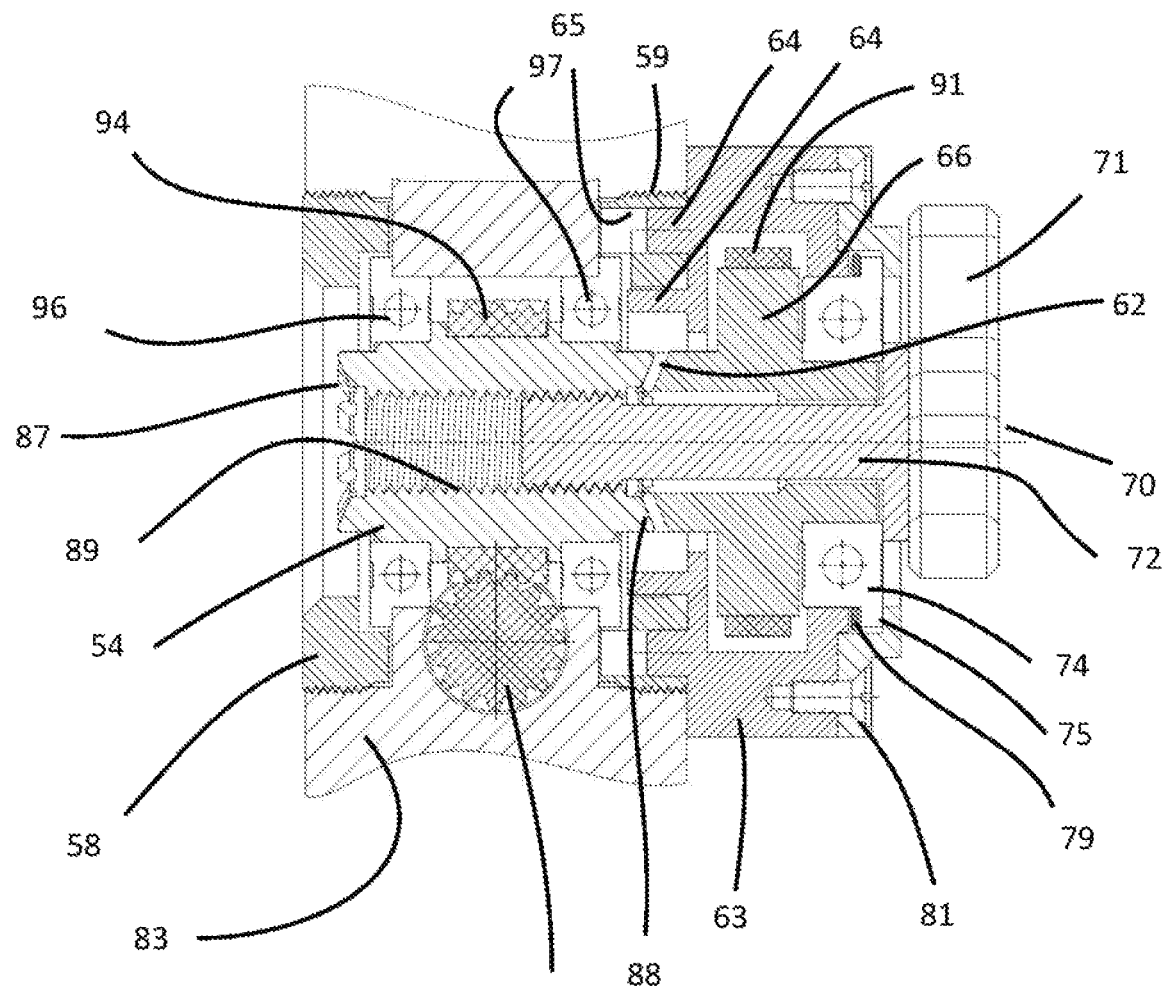
FIG. 6 is a sectional view (through line a-a of FIG. 4, though the part is not exploded in this view) of part of the new follow focus.

Referring to FIG. 6, the output gear 54 includes a first helical gear 93 which engages a second helical gear 94, the first helical gear 93 extending from the handwheel 44. The first and second helical gears are in a crossed axis arrangement, so that turning the handwheel 44 causes the output gear 54 to rotate about a perpendicular axis. The relevant axial coupling face (in this figure, the second axial coupling face 88) causes the coupling 62 of the belt pulley 66 to turn. The belt pulley 66 includes a belt 91, so that the rotation of the output gear 54 in turn causes the driving pinion 50 of the rotatable arm 46, turning a lens gear ring of a lens as previously described in the prior art systems.

Part of the belt pulley 66 is mounted in a ball bearing 74 to allow low-friction rotation, the ball bearing 74 being held against the arm housing 63 by a retainer plate 81. The ball bearing 74 includes a flange 75, and a spring element 79 is located between a surface of the arm housing 63 and the flange 75, this spring element 79 exerting exerts an axial force upon the arm housing 63 to maintain the engagement between the keyed elements 64 and keyways 65, and to compensate for the axial shift caused by the thread when the arm is rotated.

It will be seen that the rotatable arm 22 is now secured against the transmission housing 83 by its engagement with the axial coupling faces, and therefore the rotatable arm 22 itself does not have to be torsionally clamped by clamp 28. The transmission housing 83 may therefore be shorter, and operated by a single screw 67, and the rotatable arm 22 is reliably secured.

The separation of the axial fixing by the threaded stud 70 from the rotational fixing by the keyway 65 and keyed element 64 engagement allows the first interference ring 58 (or second interference ring 59 as the case may be) to be unclamped or loosely clamped so that the arm can be located into the required position by feel by the user, and then fixed in position by fully engaging the clamp 52.

The rotatable arm 22 is here described as being rotationally constrained by the interaction between keyed elements 64 on the arm housing 63 and keyways 65 on the interference rings 58. It will be realised that the keys and keyways could be reversed between components, and or may take other forms such as interlocking splines present on both components.

Here, the rotatable arm 22 is axially secured to the output gear 30 by a threaded stud 70, but this could be achieved by other means, such as a protruding threaded element on the output gear 30 that engages with a captive threaded nut provided in the rotatable arm 22. Another alternative could be the provision of non-threaded adjustable axial securement.

While the transmission housing 83 ideally provides two opposing first coupling faces 87, 88, the principles disclosed herein could equally be applied to a transmission housing 83 having a single axial coupling face for the rotatable arm 22 to engage with.

The lens gear need not be integrally attached to the rotatable arm. Different lens gears may be substituted depending on the lens being used. Instead of a user operated handwheel, the follow focus could be operated remotely with the handwheel or gearing being driven by a motor.

The invention claimed is:

1. A follow focus comprising:
   a main bridge including:
      a transmission housing, and
      an output gear;
   a removable arm, including:
      an input gear, and
      a lens turning gear or an interface capable of receiving a lens gear;
   an axial securement means that is operable by hand to engage to prevent axial movement between the arm and the transmission housing, and disengages to allow the arm to be rotated and/or removed, such that between the arm and the main bridge there is provided:
      a first engagement element having a substantially axial face having projections, and
      a second engagement element substantially axial face having corresponding indentations;
   wherein either the first or the second engagement element has a threaded outer circumference and may be fixably rotated; and
   wherein the first engagement element is borne by the arm, and the second engagement element is borne on the transmission housing, such that the axial securement means may be operated to secure the arm to the main bridge so that the projections and corresponding indentations of the first and second engagement elements engage to prevent rotational movement of the arm relative to the transmission housing.

2. A follow focus according to claim 1, wherein the second engagement element having a threaded outer circumference which may be fixably rotated comprises an annular member that engages with transmission housing.

3. A follow focus according to claim 2, comprising two coaxial threaded annular members facing opposite directions.

4. A follow focus according to claim 1, wherein the axial securement means includes a threaded bore or screw that extends through the arm and engages with the output gear.

5. A follow focus according to claim 1, wherein the output gear is driven by a helical gear.

6. A follow focus according to claim 1, wherein the transmission housing is tightened with a single clamp shaft.

7. A follow focus according to claim 6, wherein the clamp shaft is threaded.

8. A follow focus according to claim 6, wherein the clamp shaft includes a head that abut a bar with is perpendicular to the shaft axis.

9. A follow focus according to claim 1, wherein the axial securement means includes a resilient member which acts in an axial direction.

10. A follow focus according to claim 1, wherein the second engagement element additionally has projections and the first engagement element substantially axial face additionally has corresponding indentations.

11. A follow focus according to claim 9, wherein the resilient member is a spring which acts in an axial direction.

12. A follow focus, comprising:
a main bridge, including:
   a transmission housing, and
   an output gear;
a removable arm, including:
   an input gear, and
   a lens turning gear or an interface capable of receiving a lens gear;
an axial securement means that is operable by hand to engage to prevent axial movement between the arm and the transmission housing, and disengages to allow the arm to be rotated and/or removed, such that between the arm and the main bridge there is provided:
   a first engagement element having a substantially axial face having projections, and
   a second engagement element substantially axial face having corresponding indentations;
wherein either the first or the second engagement element has a threaded outer circumference and may be fixably rotated; and
wherein the second engagement element is borne by the arm, and the first engagement element is borne on the transmission housing, such that the axial securement means may be operated to secure the arm to the main bridge so that the projections and corresponding indentations of the first and second engagement elements engage to prevent rotational movement of the arm relative to the transmission housing.

13. A follow focus according to claim 12, wherein the second engagement element having a threaded outer circumference which may be fixably rotated comprises an annular member that engages with transmission housing.

14. A follow focus according to claim 13, comprising two coaxial threaded annular members facing opposite directions.

15. A follow focus according to claim 12, wherein the axial securement means includes a threaded bore or screw that extends through the arm and engages with the output gear.

16. A follow focus according to claim 12, wherein the output gear is driven by a helical gear.

17. A follow focus according to claim 12, wherein the transmission housing is tightened with a single clamp shaft.

18. A follow focus according to claim 17, wherein the clamp shaft is threaded.

19. A follow focus according to claim 17, wherein the clamp shaft includes a head that abuts a bar which is perpendicular to the shaft axis.

20. A follow focus according to claim 1, wherein the axial securement means includes a resilient member which acts in an axial direction.

\* \* \* \* \*